No. 647,695. Patented Apr. 17, 1900.
W. P. CLOTWORTHY.
PROCESS OF PACKING BAKING POWDER.
(Application filed Nov. 17, 1899.)
(No Model.)
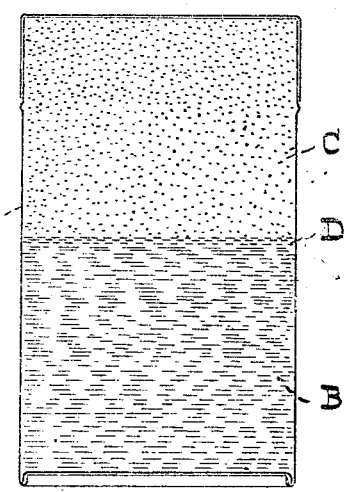
WITNESSES
Harry E. Fee.
W. M. Maynadier
INVENTOR
William Pitt Clotworthy,
by Wm. T. Howard,
atty.

UNITED STATES PATENT OFFICE.

WILLIAM PITT CLOTWORTHY, OF BALTIMORE, MARYLAND.

PROCESS OF PACKING BAKING-POWDER.

SPECIFICATION forming part of Letters Patent No. 647,695, dated April 17, 1900.

Application filed November 17, 1899. Serial No. 737,286. (No specimens.)

*To all whom it may concern:*

Be it known that I, WILLIAM PITT CLOTWORTHY, of the city of Baltimore, in the State of Maryland, have invented certain Improvements in the Packing of Baking-Powders, of which the following is a specification.

The objects of this invention are, first, to retard deterioration in the strength of baking-powders due to the chemical combination of the acid and the alkali elements thereof, and, secondly, to prevent the caking of the acid and alkaline elements caused by their absorption of moisture from the atmosphere.

The first object of the present invention is partially effected by the invention described in Letters Patent No. 462,206, granted to me on the 27th day of October, 1891, for improvements in the packing of baking-powders. In the said patented invention the acid and alkaline elements of the baking-powder are separated in a package by a layer or stratum of starch, flour, or other farinaceous matter; but while in the said invention the acid and alkaline elements of the baking-powder are prevented from coming in contact they are not protected from moisture from the atmosphere even if the package is hermetically sealed for the reason that some air containing moisture is present in the salts, and it has been found that in all cases there is sufficient moisture in the salts to effect the caking, and consequently the baking-powder has to be rubbed to disintegrate the lumps before it can be properly incorporated with the flour in bread-making operations. The first object of the present invention is also partially effected by the invention described in Letters Patent No. 462,109, granted to me on the 27th day of October, 1891, for improvements in the packing of baking-powders. In this second patented invention the acid and alkaline elements of the baking-powder are placed in the package in layers or strata, and there is formed at the line of contact of the two chemical elements a stratum of neutral salt of a limited thickness or depth, which forms an effective insulating medium and prevents, to a very large extent, further chemical action; but this invention, like the one before referred to, does not prevent the caking of the salts by the absorption of moisture.

In the present invention, as hereinafter described, I obtain all that is valuable in the two prior inventions and, further, prevent the absorption of moisture by the salts, whereby they are rendered lumpy and caked.

In carrying out the present invention I mix with the separated acid and alkaline elements of the baking-powder, which preferably consist, respectively, of acid phosphate of lime and bi-carbonate of soda, a suitable quantity of powdered starch, flour, or some other similar edible substance which forms an envelop for the particles of the salts and a separating medium between them which absorbs any moisture present and at the same time precludes adhesion of the particles and the consequent formation of lumps and cakes. The two salts thus treated are then placed in the packing-case in layers or strata, as in Letters Patent No. 462,109, before referred to, and should any chemical combination take place between the protected acid and alkaline elements, as described in said Letters Patent, the quantity of the salts involved in the combination will be much less, the saving being found by careful investigation to be about one-half, while the caking or lumping of the salts is entirely prevented.

The drawing forming a part hereof is a section of an ordinary can containing a baking-powder packed in accordance with the present invention.

In the said drawing, A represents the can or packing-case, and B and C, respectively, the protected acid and the protected alkaline salt.

D denotes the separating stratum of neutral salt formed by the chemical combination of the salts B and C, as described in Letters Patent No. 462,109, before referred to.

I do not limit my invention to the employment of acid phosphate of lime and bi-carbonate of soda as the salts used in the baking-powder, as the invention will apply to any salts adapted for the purpose wherein chemical combination takes place in their mechanical mixture, nor do I confine myself to the packing of the baking-powder in a can, as any approved case may be used, whether the same is hermetically sealed or of such nature that the free passage of air to its interior is prevented, such as a paper carton.

I claim as my invention—

1. The improvement in the art of packing baking-powders, which consists in the separation of the particles of the acid and alkaline elements thereof by an inert edible powder, and the placing of the treated chemical elements in layers or strata in a packing-case, substantially as specified.

2. The process of packing a baking-powder, which consists in mixing with the separated acid and alkali elements thereof, powdered starch or some similar substance, to prevent their caking or lumping, as described, and then placing the two bodies in layers or strata in a packing-case, substantially as specified.

WILLIAM PITT CLOTWORTHY.

Witnesses:
WM. T. HOWARD,
HARRY E. LEE.